United States Patent
Sato et al.

(10) Patent No.: US 6,329,630 B1
(45) Date of Patent: Dec. 11, 2001

(54) PROCESS OF CLADDING BY WELDING

(75) Inventors: Akio Sato; Minoru Kawasaki; Chikatoshi Maeda, all of Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/316,065

(22) Filed: May 21, 1999

(30) Foreign Application Priority Data

May 25, 1998 (JP) .................................................. 10-143400

(51) Int. Cl.$^7$ ..................................................... B23K 26/00
(52) U.S. Cl. .................. 219/121.64; 134/1; 219/121.83; 219/121.85
(58) Field of Search .................... 219/121.63, 121.64, 219/121.83; 134/1

(56) References Cited

U.S. PATENT DOCUMENTS

| | | | |
|---|---|---|---|
| 4,720,621 | * | 1/1988 | Langen .............................. 219/121.6 |
| 4,898,650 | * | 2/1990 | Wu et al. .................................. 134/1 |
| 4,980,536 | * | 12/1990 | Asch et al. ....................... 219/121.68 |
| 5,637,245 | * | 6/1997 | Shelton et al. ............................ 134/1 |
| 6,002,098 | * | 12/1999 | Pircher et al. ................. 219/121.85 |

FOREIGN PATENT DOCUMENTS

| | | | |
|---|---|---|---|
| 0 709 145 A | | 5/1966 | (EP) . |
| 61-289986 | * | 12/1986 | (JP) . |
| 64-62282 | | 3/1989 | (JP) . |
| 3-32481 | | 2/1991 | (JP) . |
| 6-88120 | | 3/1994 | (JP) . |
| 6-257505 | | 9/1994 | (JP) . |
| 9-155583 | * | 6/1997 | (JP) . |
| 9-192861 | | 7/1997 | (JP) . |

* cited by examiner

Primary Examiner—Geoffrey S. Evans
(74) Attorney, Agent, or Firm—Finnegan, Henderson, Farabow, Garrett & Dunner, L.L.P.

(57) ABSTRACT

A process of cladding by welding includes the steps of: (1) preparing a workpiece having a cladding-scheduled portion including an exposed normal region, the exposed normal region having a normal surface including a possibility that a foreign substance portion exists, and the foreign substance portion to form a defect of cladding; (2) irradiating the exposed region of the cladding-scheduled portion of the workpiece with an high-density energy beam, the high-density energy beam capable of eliminating or decreasing the foreign substance portion, substantially without melting the exposed normal region of the cladding-scheduled portion; and (3) covering the exposed normal region of the cladding-scheduled portion of the workpiece with a clad layer.

9 Claims, 7 Drawing Sheets

Fig.3
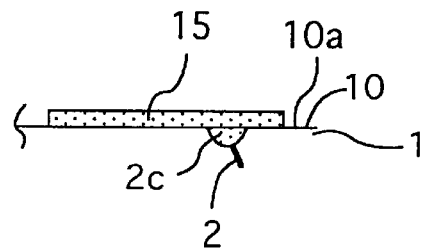
Fig.4
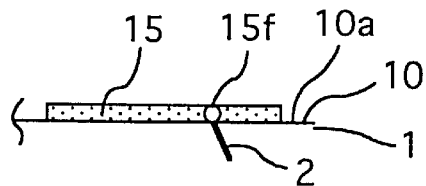
Fig.5(A)        Fig.5(B)
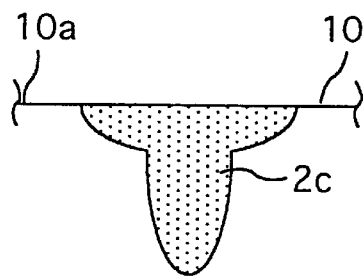 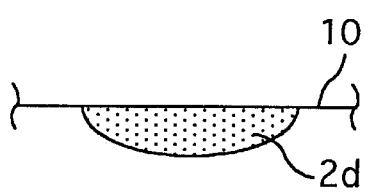
Fig.6
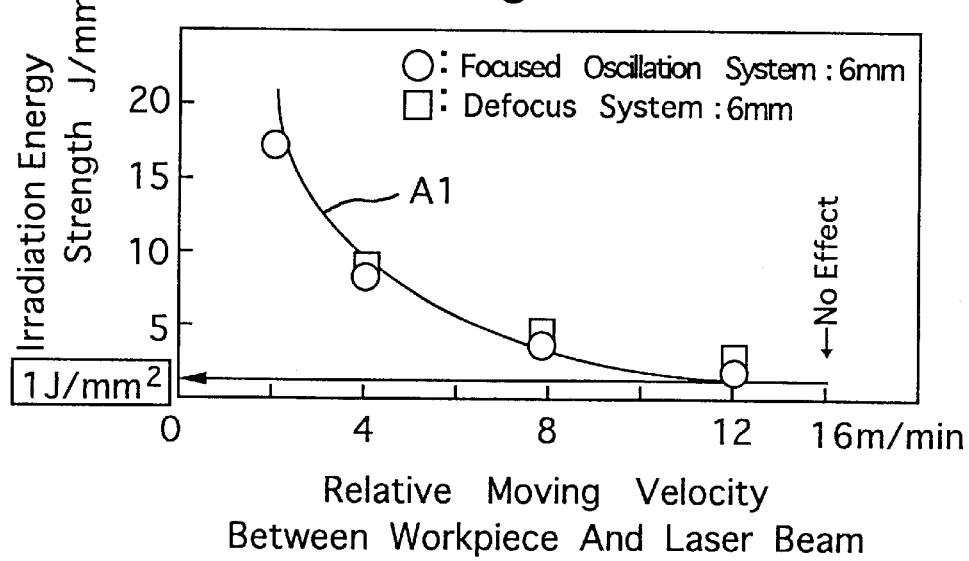

PROCESS OF CLADDING BY WELDING

BACKGROUND OF THE INVENTION

1. Field of the Invention

The present invention relates to a process of cladding by welding which is advantageous in suppressing defects of cladding.

2. Description of the Related Art

Japanese unexamined patent publication 6 (1994)-257,505 discloses a conventional process. Using a cylinder head formed of aluminum alloy having a cladding-scheduled portion for constituting a valve seat, this conventional process irradiates the cladding-scheduled portion with a laser beam to remelt and resolidify all of the surface of the cladding-scheduled portion. After that, this conventional process covers the resolidified portion with a clad layer. Even when the cladding-scheduled portion involves gas therein, this conventional process can release and eliminate gas so as to leave less gas in the cladding-scheduled portion before cladding. Accordingly, this conventional process can suppress expansion of gas in cladding the cladding-scheduled portion by welding.

Japanese unexamined patent publication 64 (1989)-62,282 discloses another conventional process. This another conventional process forms a bead layer by high-frequency welding to produce a seam-welded ferrous pipe. This process irradiates the bead layer with a laser beam after immediately welding, so as to remelt and eliminate weld-defects remaining in the bead layer. In this case, the bead layer is irradiated with the laser beam in such a manner that the bead layer causes little or no molten metal. This process also discloses a technique which detects plasma light generated in eliminating the weld-defects so as to examine the presence of weld-defects in the bead layer.

Japanese unexamined patent publication 6 (1994)-88,120 discloses still another conventional process concerning apparatuses which is to be employed in high temperatures, such as boilers or turbines. This process forms a bead layer by welding, and then irradiates a heat-affected zone in the vicinity of the welded bead layer with a laser beam or an electron beam so as to perform an eliminating step for eliminating the creep-voids remaining in the heat-affected zone.

According to the abovesaid publication 6 (1994)-257,505, almost all of the cladding-scheduled portion constitutes an exposed normal region having a normal surface: the cladding-scheduled portion has very few portions containing gas. In spite of this, this publication technique remelts all of the surface of the cladding-scheduled portion to generate molten metal at the all surface. Accordingly, due to such molten metal and the resultant solidification, this publication technique causes a problem that roughness is generated in all of the surface of the cladding-scheduled portion, thereby causing a problem that the clad layer is unevenness in thickness. Further, remelting all of the surface of the cladding-scheduled portion, this publication technique largely heat-affects the base material constituting the workpiece to rise a problem that balance collapses in strength of the workpiece.

Also, some workpieces have a condition that the cladding-scheduled portion is restricted to be small in thickness. In such workpieces, this publication technique, remelting all of the surface of the cladding-scheduled portion, might cause a problem that some holes unexpectedly are formed in the cladding-scheduled portion. This reason is that control is not necessarily easy in the remelting as production technology.

Since the aforesaid publication technique 64 (1989)-62,282 irradiates all of the surface of the welded bead layer with the laser beam after producing the welded bead layer constituting a clad layer, this publication technique sometimes causes a problem that metallic structure is transformed or deteriorated in all of the surface of the welded bead layer.

Also, since the aforesaid publication technique 6 (1994)-88,120 performs the eliminating step after forming the welded bead layer, this publication technique sometimes causes a problem that metallic structure is transformed or deteriorated in all of the welded bead layer.

SUMMARY OF THE INVENTION

The present invention has been developed in view of the above circumstances.

It is a primary object of the present invention to provide a process of cladding by welding, which advantageously suppresses a clad layer on a cladding-scheduled portion from being transformed or deteriorated in metallic structure while eliminating a foreign substance portion to be defects in cladding. It is another object of the present invention to provide a process of cladding by welding, which performs an eliminating step before covering the cladding-scheduled portion with a clad layer, substantially without melting an exposed normal region of the cladding-scheduled portion.

A process of the cladding by welding according to a first aspect of the present invention comprises the steps of: (1) preparing a workpiece having a cladding-scheduled portion including an exposed-normal region, the exposed normal region having a normal surface including a possibility that a foreign substance portion exists, and the foreign substance portion to form a defect in cladding; (2) irradiating the exposed normal region of the cladding-scheduled portion of the workpiece with a high-density energy beam, the high-density energy beam capable of eliminating or decreasing the foreign substance portion, substantially without melting the exposed normal region of the cladding-scheduled portion; and (3) covering the exposed normal region of the cladding-scheduled portion of the workpiece with a clad layer.

The first aspect of the present invention eliminates the foreign substance portion existing in the cladding-scheduled portion of the workpiece, by irradiating the exposed normal region of the cladding-scheduled portion of the workpiece with the high-density energy beam. Thereafter, the first aspect of the present invention covers the cladding-scheduled portion of the workpiece with the clad layer. Therefore, when the cladding by welding is performed, the foreign substance portion in the cladding-scheduled portion is eliminated or decreased for purification. Accordingly, the first aspect of the present invention can suppress defects in cladding, thereby forming an appropriate clad layer to become advantageous in ensuring strength which the clad layer has originally.

Further, the first aspect of the present invention can suppress the melting of the exposed normal region having a normal surface which occupies the majority of the cladding-scheduled portion. Accordingly, the first aspect of the present invention can suppress roughness in the surface constituting the cladding-scheduled portion, thereby suppressing dispersion in thickness of the clad layer, as compared with the conventional technique which remelts all the surface of the exposed normal region and which is disclosed in the aforesaid unexamined patent publications.

Moreover, the first aspect of the present invention can suppress the transforming or the deteriorating of the exposed normal region of the cladding-scheduled portion, thereby advantageously ensuring balance of strength of the workpiece. Also, the first aspect of the present invention can prevent holes from being unexpectedly formed in the cladding-scheduled portion of the workpiece, even when the cladding-scheduled portion of the workpiece is restricted to be thin in thickness.

According to a second aspect of present invention, the irradiating step generates a physical amount in eliminating or decreasing the foreign substance portion, and the irradiating step has a detecting operation for detecting a degree that the foreign substance portion is eliminated or decreased. So, the second aspect can detect the presence of the foreign substance portion, namely the remainder thereof, without destroying the workpiece. The second aspect of the present invention is advantageous in ensuring quality of the workpiece, provided that the information about the presence of the foreign substance portion is supplied with feed-back to production conditions for producing workpieces.

Preferable Mode

The present invention uses a workpiece having a cladding scheduled-portion on which a clad layer is to be placed. The workpiece is not limited within material thereof; so, the workpiece may be formed of a well-known metal, such as aluminium family alloy, iron family alloy, or titanium family alloy. The aluminium family alloy may be casting alloy or expanding alloy. The alloy may include at least one element selected from a group consisting of Mg, Ni, and Fe, exemplyfing AC2A, AC4B, AC4D, AC5A, or AC1A in Japanese Industrial Standards (JIS). When the workpiece is formed of aluminum family alloy, the workpiece may be material after heat-treatment. The heat-treatment may be one selected from a group from T2 treatment to T9 treatment—in particular T6 treatment. The workpiece may be cast products, forged products, and machined products.

The high-density energy beam concerning the present invention is represented by a laser beam—sometimes an electron beam as occasion demands. The laser beam may be a $CO_2$ laser beam, a YAG laser beam, a Ruby laser beam, and the like.

The high-density energy beam concerning the present invention has such a energy strength that a beam can eliminate or decrease the foreign substance portion existing in the cladding-scheduled portion, substantially without melting the exposed normal region of the cladding-scheduled portion. Generally, the workpiece has a larger reflection rate with respect to the high-density energy beam; the foreign substance portion has a higher absotptance rate than the workpiece with respect to the high-density energy beam. Accordingly, it is preferable that the present invention selects energy strength of the high-energy beam after consideration of a reflection rate and an absotptance rate with respect to the high-density energy beam.

The foreign substance portion may be inclusions, such as non-metallic inclusions, which are generated or involved in the workpiece when the workpiece itself or material for constituting the workpiece is produced by pouring molten metal. The inclusion is represented by oxides containing a base material component of the workpiece, or oxides containing other components.

There is a case where the workpiece undergoes treatments such as cutting-treatments using lubricants, or cleaning-treatments using detergents or water. In such a case, the workpiece comes in contact with the lubricants, the detergents, or the water.

Accordingly, when the workpiece has concave defects such as shrinkage-holes, pin-holes, blow-holes, or seams; the lubricants, the detergents, or the water may enter the aforesaid concave defects as a foreign substance portion. Therefore, the foreign substance portion is represented by lubricants, detergents, or water which enter the aforesaid concave defects.

Generally, having a larger absorption rate with respect to the high-density energy beam, such foreign substance portions absorb a laser beam than the workpiece. Therefore, when the cladding-scheduled portion is irradiated with the high-density energy beam in the eliminating step, the present preferable mode can melt or release the foreign substance portion, thereby eliminating or decreasing the foreign substance portion, or thereby sealing the foreign substance portion which is not exposed outwardly but remains. And then, the present preferable mode does not substantially melt the exposed normal region of the cladding-scheduled portion.

The preferable mode covers the exposed normal region of the cladding-scheduled portion of the workpiece with a clad layer, after the eliminating step for eliminating or decreasing the foreign substance portion. The clad layer implies a layer with which the workpiece is overlaid. The clad layer can exhibit a welded bead layer, and a layer placed with flame-spray. Therefore, the cladding-scheduled portion is covered with the clad layer by a laser beam welding method. Also, the preferable mode sometimes permits a usually-used arc welding method, a TIG arc welding method, or a MIG arc welding method.

If the foreign substance portion exists in the cladding-scheduled portion, the foreign substance portion is melted or released by heat in welding to invade the clad layer, thereby producing defects in cladding. The present invention previously eliminates or decreases the foreign substance portion capable of forming defects in cladding. Accordingly, the present invention previously prevents defects in cladding from occurring in the clad layer. So, the present invention fundamentally differs from the conventional techniques which repair the defect after cladding.

Namely, although the repaired welded layer constituting the clad layer is good in appearance, it disadvantageously has discontinuity of its metallic structure, and a heat distortion because of local heat or local melting. Meanwhile, a preferable mode of the present invention does not repair the clad layer after cladding, but pretreats the cladding-scheduled portion for elimination of the foreign substance portion before cladding. So, the preferable mode of the present invention can obtain an ability which the clad layer has originally.

In cladding by welding, there is a case where a physical amount is generated in eliminating or decreasing the foreign substance portion.

The preferable mode detects the physical amount so as to examine a degree that the foreign substance portion is eliminated or decreased, namely so as to examine the remainder of the foreign substance portion. Provided that information about elimination or decrease of the foreign substance portion is supplied with feed-back to a workpiece-producing method, the foreign substance portion can advantageously be reduced.

When the physical amount is larger than a predetermined threshold value, the foreign substance portion may considerably be large, and a part of the foreign substance portion may remain. In this case, it is preferable that the workpiece is re-examined.

The physical amount generated in eliminating the foreign substance portion is represented by a sound or light—an audible sound, visible light, a non-audible sound, and non-visible light.

BRIEF DESCRIPTION OF THE DRAWINGS

The exact nature of the present invention, as well as other objects and advantages thereof, will be readily apparent from consideration of the following specification relating to the annexed drawings in which:

FIG. 3 shows a schematic diagram illustrating a situation in which the cladding-scheduled portion of a workpiece is covered with a clad layer after the eliminating step;

FIG. 4 shows a schematic diagram illustrating a situation in which the cladding-scheduled portion of the workpiece is covered with the clad layer before the eliminating step;

FIG. 5(A) shows a schematic diagram for illustrating a remelted-resolidified state having a keyhole effect;

FIG. 5(B) shows a schematic diagram for illustrating a usually melted-solidified state;

FIG. 6 shows a graph exhibiting a relationship between a relative moving velocity of workpiece and an irradiation energy strength;

DETAILED DESCRIPTION OF THE PREFERRED EMBODIMENT

Now, a preferred embodiment according to the present invention will hereinafter be described with reference drawings.

The present embodiment employs a workpiece 1 having the cladding-scheduled portion 10 exposed outwardly. All most of the cladding-scheduled portion 10 constitute an exposed normal region 10a having a normal surface 10c—the workpiece 1 has a high quality. So, very few parts of the cladding-scheduled portion 10 has a possibility that a foreign substance portion 2 exists.

The foreign substance portion 2 is sometimes inclusions which are generated or involved in casting the workpiece 1 and which is exposed outwardly. Also, the foreign substance portion 2 is sometimes formed by detergents, lubricants, and water entered shrinkage holes, pin-holes, or seams generated at the cladding-scheduled portion 10 of the workpiece 1. The present embodiment eliminates the foreign substance portion 2 of the cladding-scheduled portion, before cladding by welding so as to improve quality of the workpiece 1 much further.

The workpiece 1 is a cast product formed of aluminum alloy containing Cu and Si to exhibit a good castability. This aluminum alloy is JIS AC2C—cast products produced by use of a sand mold or by use of a metallic mold.

Figure 1:
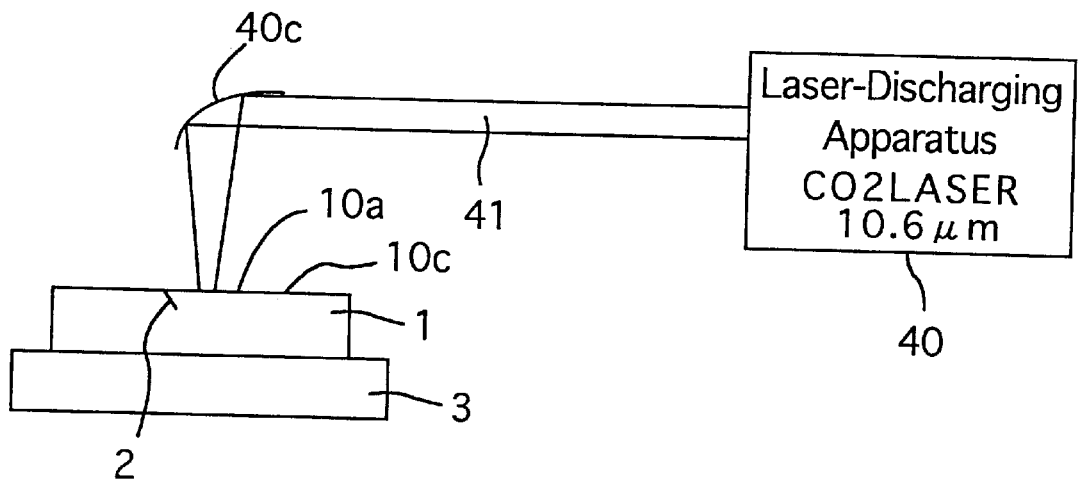
FIG. 1 shows a schematic diagram illustrating a situation in which a cladding-scheduled portion of a workpiece is irradiated with a laser beam.

As shown in FIG. 1, the workpiece 1 is placed on a movable table 3 for moving two-dimensionally or three-dimensionally, an NC table. An eliminating step is performed. In the eliminating step, the movable table 3 is driven to move the workpiece 1. Also, a laser beam 41 working as a high-density energy beam is discharged to the cladding-scheduled portion 10 of the workpiece 1 by way of a mirror 40c, from a laser-discharging apparatus 40, a $CO_2$ laser-discharging apparatus. The laser beam 41 has a wavelength of far infrared radiation, 10.6 $\mu$m. The laser beam 41 has an energy strength which eliminates the foreign substance portion 2 which is exposed at the cladding-scheduled portion 10 of the workpiece 1 and which does not substantially melt at the exposed normal region 10a of the cladding-scheduled portion 10 of the workpiece 1.

Figures 2A, 2B:
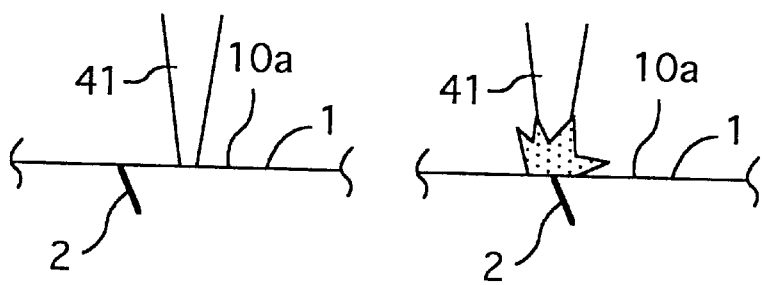
FIG. 2(A) shows a schematic diagram illustrating a eliminating step in which the cladding-scheduled portion is irradiated with the laser beam and in which a foreign substance portion is not irradiated with the laser beam.
FIG. 2(B) shows a schematic diagram illustrating a eliminating step in which the foreign substance portion is irradiated with the laser beam.

As schematically shown in FIG. 2(A), even when the foreign substance portion 2 is exposed at the cladding-scheduled portion 10 of the workpiece 1, the exposed normal region 10a of the cladding-scheduled portion 1 does not melt substantially, until the foreign substance portion 2 is irradiated with the laser beam 41. The reason is that the workpiece 1 has a lower absorption rate of the laser beam so as to reflect the laser beam.

As schematically shown in FIG. 2(B), when the foreign substance portion 2 is irradiated with the laser beam 41, the foreign substance portion 2 absorbs the laser beam 41 since the foreign substance portion 2 has a higher absorption rate of the laser beam—The foreign substance portion 2 is melted or released as gas to be eliminated.

Figure 2C:
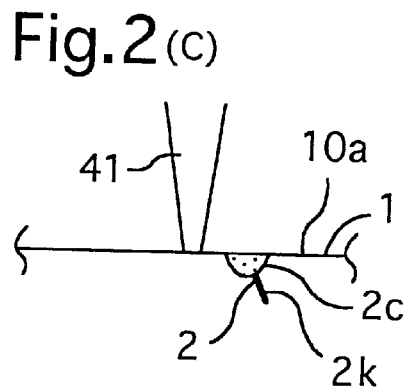
FIG. 2(C) shows a schematic diagram illustrating the eliminating step in which the foreign substance portion is decreased with the laser beam and in which a remaining foreign substance portion is sealed with a remelted-resolidified portion.

When quantity of heat is large, a circumference of the foreign substance portion 2 may be remelted and resolidified to locally generate a remelted-resolidified portion 2c. Even when a part 2k of the foreign substance portion 2 remains, the remelted-resolidified portion 2c easily seals and covers such remaining part 2k, as shown in FIG. 2(C). Thus, it is prevented that a remaining part 2k is exposed outwardly.

The chemical analysis—EDX analysis—about the vicinity of the remelted-resolidified portion 2c indicated components of lubricants and components of detergents, besides components of the workpiece 1.

The remelted-resolidified portion 2c is only locally generated in the cladding-scheduled portion 10; so, the remelted-resolidified portion 2c is much smaller than the exposed normal region 10a in area.

After the foreign substance portion 2 is eliminated, the present embodiment performs a covering step. In the covering step, as shown in FIG. 3, a cladding material is piled onto the cladding-scheduled portion 10 to form a clad layer 15. The covering step allows that the covering material is irradiated with the laser beam, after or before the covering material is supplied onto the cladding-scheduled portion 10. Also, the covering step may allow that a generally used welding method and a TIG welding method are employed in place of the laser beam.

If the foreign substance portion 2 remains, being exposed outwardly in the cladding-scheduled portion 10, as schematically shown in FIG. 4, the foreign substance portion 2 may generate gas due to heat in cladding, thereby generating gaseous defects 15f such as pin-holes.

Incidentally, the eliminating step concerning the present embodiment does not melt the exposed normal region 10a substantially. Therefore, the eliminating step is smaller than the covering step in input energy per unit time and unit area. Accordingly, in the eliminating step, "P1" exhibits output of the laser beam 41, "Q1" exhibits irradiation energy strength of the laser beam 41 per unit time and unit area, and "V1" exhibits a relative moving velocity between the workpiece 1 and the laser beam 41.

In the covering step, "P2" exhibits output of the laser beam 41, "Q2" exhibits irradiation energy strength of the laser beam 41 per unit time and unit area, and "V2" exhibits a relative moving velocity between the workpiece 1 and the laser beam 41. It is preferable that the present embodiment satisfies at least one of the followings (1)–(3)

(1) P1<P2
(2) Q1<Q2
(3) V2>V1

The laser beam 41 can easily reach a deep portion of the void-shaped defect. So, the laser beam 41 can eliminate the foreign substance potion 2 entering the deep portion of the void-shaped defect to generate the remelted-resolidified portion 2c. In this case, as shown in FIG. 5(A), the remelted-resolidified portion 2c generally forms a deep shape having a key hole effect. Meanwhile, when arc heat is used in eliminating the foreign substance portion 2 in place of the laser beam, a remelted-resolidified portion 2d is formed having a flat shape, as shown in FIG. 5(B).

As understood from the above-mentioned description according to the present embodiment, after the foreign substance portion 2 exposed outwardly at the cladding-scheduled portion 10 is eliminated with the laser beam, the cladding-scheduled portion 10 is covered with the clad layer 15. Therefore, before cladding, the cladding-scheduled portion 10 is purified, which prevents defects from being generated in cladding. Thus, the present embodiment is advantageous in making the clad layer 15 good and in ensuring strength of the clad layer 15.

According to the present embodiment, even when cladding-scheduled portion 10 of the workpiece 1 is irradiated with the laser beam 41, the laser beam 41 does not substantially melt the normal surface 10c of the exposed normal region 10a occupying the majority of the cladding-scheduled portion 10. So, the present embodiment suppresses roughness in the cladding-scheduled portion 10, and it prevents dispersion of the thickness in the clad layer 15, as distinct from the case where all surface of the cladding-scheduled portion 10 melts with subsequent resolidification. Accordingly, the present embodiment prevents the cladding-scheduled portion 10 from being transformed and deteriorated, and it prevents strength balance of the workpiece 1a from collapsing.

Investigation

The present inventor carried out investigation about irradiation. FIG. 6 shows a graph exhibiting a relationship between a relative moving velocity and input heat which exhibits irradiation energy strength in the cladding-scheduled portion 10. In such a case, the present inventor carried out a scanning system which oscillated a laser beam narrowed in diameter to realize an oscillation width of 6 [mm]—a focused oscillation system. Also, the present inventor carried out another scanning system which enlarged a laser beam diameter with defocus to realize a beam diameter of 6 [mm]—a defocus system.

As shown at a characteristic line "A1" in FIG. 6, as the relative moving velocity of the workpiece 1 was smaller, the irradiation energy strength was larger per unit time and a unit area. Also, as the relative moving velocity of the workpiece 1 was larger, the irradiation energy strength was smaller per unit time and a unit area.

The present inventor investigated about an adequate energy strength of the laser beam 41 for eliminating the foreign substance portion 2 exposed outwardly at the cladding-scheduled portion 10, without melting the exposed normal-region 10a of the cladding-scheduled portion 10. In such a case, the present inventor carried out a scanning system which oscillated a laser beam narrowed in diameter to realize a oscillation width of 6 [mm]—a focused oscillation system. Also, the present inventor carried out another scanning system which enlarged a laser beam diameter with defocus to realize a beam diameter of 6 [mm]—a defocused system.

The investigated results was as follows:

As for the irradiation energy strength to the cladding-scheduled portion 10 per unit time and unit area, the exceeding of 1 [$J/mm^2$] effectively eliminated the majority of the foreign substance portion 2 being exposed at the cladding-scheduled portion 10, when the laser output exhibited 3 [kw]. The unit of [J] is capable of being converted to a unit of [w·s].

As understood the characteristic line "A1" in FIG. 6, as a relative moving velocity was larger between the workpiece 10 and the laser beam, an irradiation energy strength per unit time and unit area was smaller to indicate little ability for eliminating the foreign substance portion 2.

Figure 7:
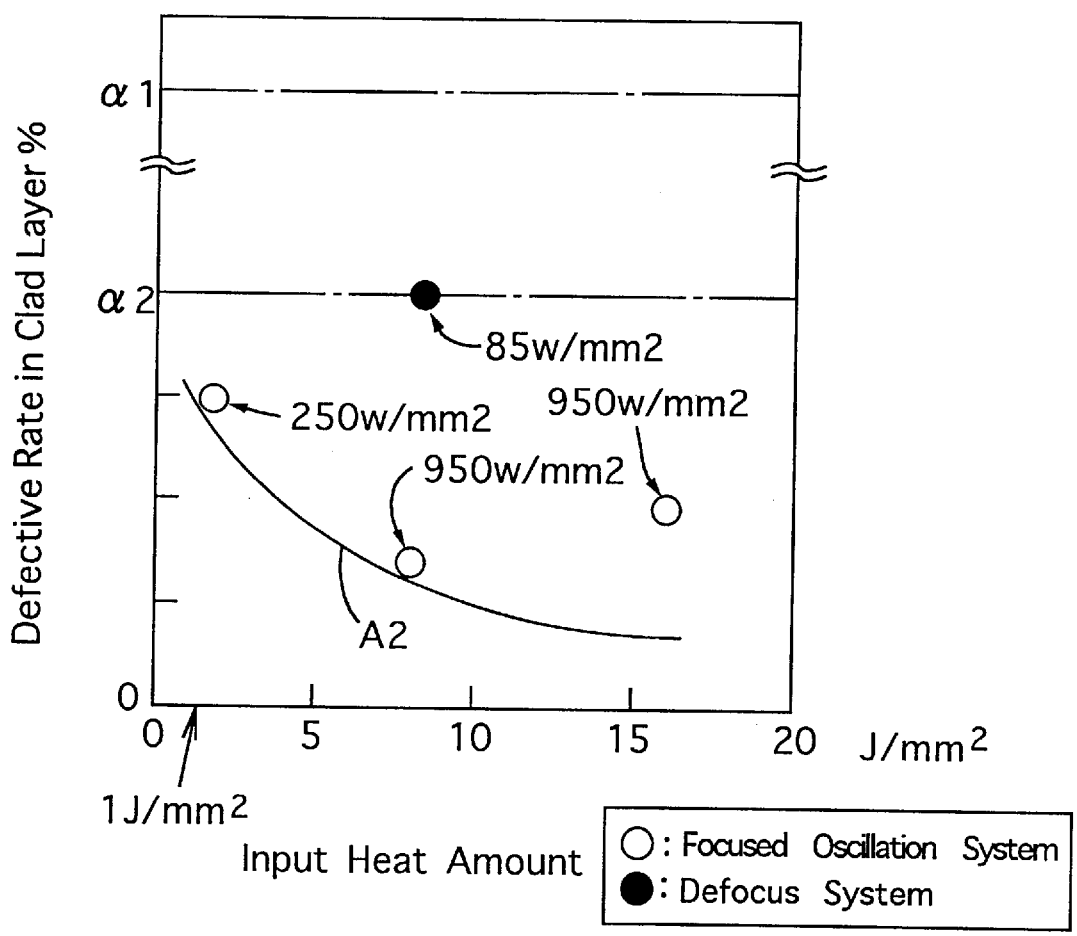
FIG. 7 shows a graph exhibiting a relationship between an input heat and a defective rate in cladding.

FIG. 7 shows the investigated results with respect to a defective rate in the clad layer. Marks of "○" in FIG. 7 exhibit a scanning system which oscillates a focused laser beam 41 with an oscillation width of 6 [mm]. Marks of "●" in FIG. 7 exhibit a scanning system which uses a defocused laser beam 41 possessing an enlarged diameter having a beam width of 6 [mm].

When the cladding was performed without a eliminating step concerning the present embodiment, the defective rate of the clad layer indicated "α1" in FIG. 7. When the cladding was performed after a eliminating step concerning the present embodiment, the defective rate of the clad layer indicated a "α2" or less in FIG. 7 to be reduced considerably as follows:

$\alpha 2 = \alpha 1 \times (0.25 - 0.67)$

According to the investigated results, the characteristic line "A2" in FIG. 7 indicated a considerable decrease in the defective rate, when input heat amount to the cladding-scheduled portion 10 was 1 [J/mm$^2$] or more per unit time and area. As shown at the characteristic line "A2" in FIG. 7, when the input heat amount was larger, the defective rate was smaller in the clad layer. The excess of input heat amount improved an ability for eliminating the foreign substance portion 2; however, it sometimes caused melting in the exposed normal region 10a of the cladding-scheduled portion 10. Thus, it is preferable that over-increase of input heat amount is avoided.

According to the above investigation, judging from an ability for eliminating the foreign substance portion 2, when the workpieces 1 was formed of aluminum alloy 1 and when the laser beam 41 was the $CO_2$ laser beam, it was adequate that energy strength of the laser beam 41 per unit time and area was 85 [w/mm$^2$] or more, and it was adequate that input heat amount per unit time and area was 1 [J/mm$^2$] or more.

Example 1

Figure 8:
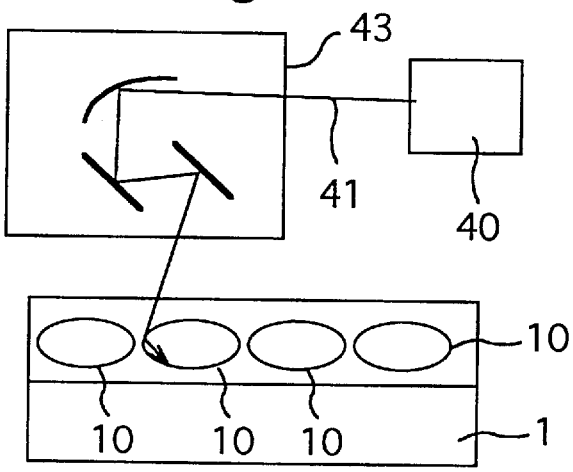
FIG. 8 shows a schematic diagram illustrating a situation in which a cladding-scheduled portion is irradiated with a laser beam discharged from a laser-discharging apparatus.
Figure 9:
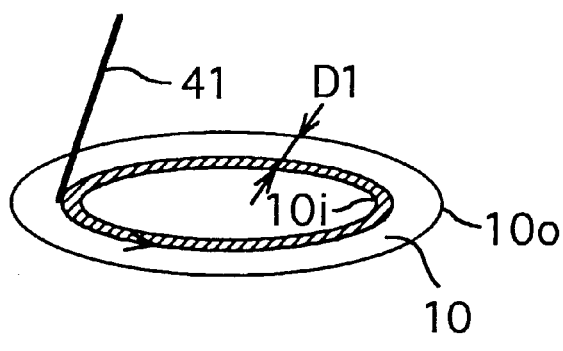
FIG. 9(A) shows a schematic diagram illustrating a situation in which an inner verge of the cladding-scheduled portion having a ring-shape is spirally irradiated with the laser beam discharged from the laser-discharging apparatus.
FIG. 9(B) shows a schematic diagram illustrating a situation in which the central portion of the cladding-scheduled portion having the ring-shape is spirally irradiated with the laser beam discharged from the laser-discharging apparatus.
FIG. 9(C) shows a schematic diagram illustrating a situation in which an outer verge of the cladding-scheduled portion having the ring-shape is spirally irradiated with the laser beam discharged from the laser-discharging apparatus.
Figure 9:
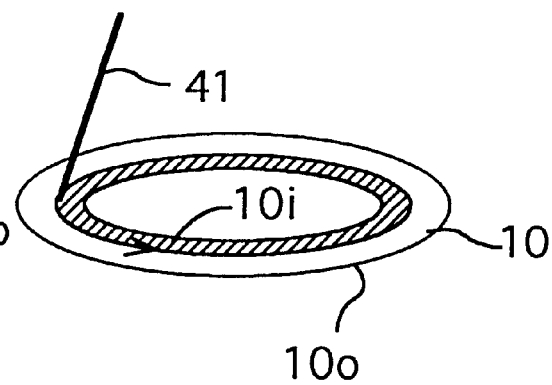
Figure 9:
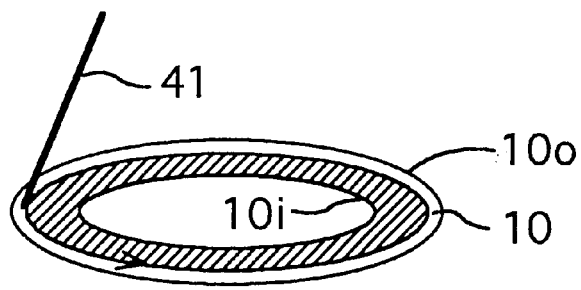

FIGS. 8 and 9 shows Example 1 which uses a workpiece 1 which is formed of aluminum alloy constituting a cylinder block of an engine. For producing the workpiece 10, Example 1 performs a casting step for solidifying aluminum molten metal to obtain a cast product, a cleaning step for cleaning the cast product with a cleaning liquid including water and detergents, and a cutting step for cutting portions of the cast product with tools while lubricating the cast product.

The workpiece 10 exhibits a high quality, having few impurities, few pin-holes, and a much smaller porosity rate. For obtaining further high quality, in Example 1, a eliminating step is performed with respect to the cladding-scheduled portion 10 before formation of the clad layer.

As shown in FIG. 8, Example 1 uses equipment including a laser-discharging apparatus 40 which is constituted by a $CO_2$ laser for discharging a laser beam 41, and which includes a beam-scanning apparatus 43. In Example 1, the bean-scanning apparatus 43 discharges the laser beam 41 from the laser-discharging apparatus 40 to all of cladding-scheduled portions 10.

The conditions carried out by the present inventor were in Example 1 as follows: The cladding-scheduled portion 10 included a ring-shape having a width "D1" in a radius direction of approximately 10 [mm]. The laser beam 41 was set at approximately 10 inches in focus distance, and the laser output was set at approximately 3 [kw]. The beam-scanning apparatus 43 spirally discharged the laser beam 41 in such a manner that the laser beam 41 rotated 100 revolutions per second—100 rps. The spiral diameter was set at 15 [mm] at an initial stage for an inner verge 10i of the cladding-scheduled portion 10, and it was set at 35 [mm] at a closing stage for an outer verge 10o of the cladding-scheduled portion 10. When the cladding-scheduled portion 10 was irradiated with the laser beam 41, almost all of the laser beam 41 was reflected on the cladding-scheduled portion 10. The sealing gas was unnecessary for preventing oxidation.

The cladding-scheduled portion 10 was irradiated with the laser beam 41 as follows: firstly, as shown in FIG. 9(A), the laser beam 41 spirally hit the inner verge 10i of the cladding-scheduled portion 10; secondarily, as shown in FIG. 9(B), the laser beam 41 spirally hit a middle of the cladding-scheduled portion 10; continuously, as shown in FIG. 9(C), the laser beam 41 spirally hit the outer verge 10o of the cladding-scheduled portion 10. Such spirally scanning operation shown in FIGS. 9(A) to 9(C) was finished within one second.

As abovesaid, Example 1 performed a mode in which the laser beam 41 was spirally scanned from the inner verge 10i to the outer verge 10i. Conversely, Example 1 allows another mode in which the laser beam 41 is spirally scanned from the outer verge 10o to the inner verge 10i.

Example 2

FIGS. 10 to 13 shows Example 2 which uses a workpiece 1 formed of aluminum alloy and constituting a cylinder head for a vehicle. Example 2 covers a plurality of ring-shaped valve seats with the clad layer. The valve seats constitute a cladding-scheduled portion 10, respectively.

For producing the workpiece 1, Example 2 performs a casting step for solidifying aluminum molten metal by a low-pressure casting method to obtain a cast product ( material: JIS AC2C ), a cleaning step for cleaning the cast product with a cleaning liquid including water and detergents, and a cutting step for cutting portions of the cast product with tools while lubricating the cast product with lubricants.

In Example 2, the workpiece 10 is treated by T6 heat-treatment. The workpiece 10 exhibits a high quality, having few impurities, few pin-holes, and a much smaller porosity rate. For obtaining further high quality, Example 2 performs a eliminating step with respect to the valve seat constituting the cladding-scheduled portion 10 before formation of the clad layer.

Figure 10:
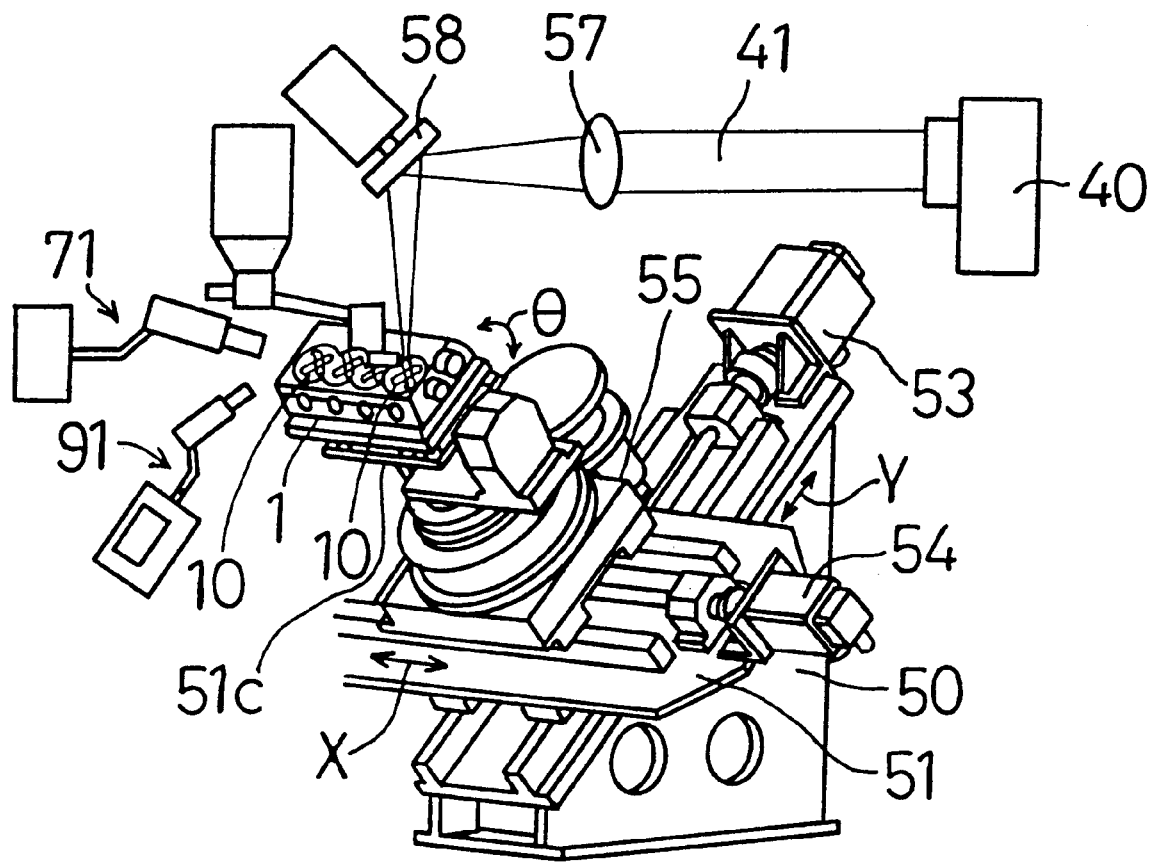
FIG. 10 shows a perspective view illustrating a situation in which a cladding-scheduled portion of a workpiece is irradiated with a laser beam discharged from a laser-discharging apparatus.

As shown in FIG. 10, a base 50 concerning Example 2 includes a movable table 51 having a setting table 51c. The setting table 51c of the movable table 51 detachablely sets the workpiece 1. The setting table 51c is movable by Y-axial motor 53 in an arrow direction "Y", it is movable by X-axial motor 54 in an arrow direction "X, and it is rotatable by a θ-axial motor 55 in an arrow direction "θ" around a line which imaginarily connects a plurality of valve seats In Example 2, the laser-discharging apparatus 40 constituted by a $CO_2$ laser discharges a laser beam 41 to the valve seats constituting the cladding-scheduled portion 10 in the cylinder head constituting the workpiece 1, by way of a lens 57 and a beam oscillator 58 shown in FIG. 12.

Conditions of the eliminating step carried out by the present inventor were as follows:

A type of laser was a $CO_2$ laser.

A defocused laser beam was used having a beam width of 6 [mm].

A laser output was set at 3 [kw].

A moving workpiece-velocity was set at 4000 [mm/min].

When the foreign substance portion 2 is eliminated by the laser beam 41, light or sounds constituting a physical amount, such as visible light or audible sounds, is generated. So, the first detecting apparatus 71 and the second detecting 91 are disposed to approach the valve seat of the cylinder head. The first detecting apparatus 71 is to detect a degree to eliminate the foreign substance portion 2, on the basis of light constituting a physical amount, such as visible light, generated in eliminating the foreign substance portion 2. Thus, the first detecting apparatus 71 has a focusing lens 72, a light-receiving element 73 for receiving light passed through the focusing lens 72 and for transmitting receive electric signals, an amplifier circuit 74 for amplifying the receive electric signals, a correcting circuit 75 for correcting a distortion of the receive electric signals, a filter circuit 76 for eliminating noises, a binary circuit 77 for converting the receive electric signals to binarized signals, a comparing means 78 for comparing the binarized signal with a predetermined threshold voltage, a judging means 79, and an informing means 80. The judging means 79 presumes that the foreign substance portion 2 is eliminated when the binarized signal is less than the predetermined threshold voltage. Also, in spite of performing the eliminating step, the judging means 79 presumes that parts of the foreign substance portion 2 remain when the binarized signal is equal to or more than the predetermined threshold voltage. The informing means 80 informs a warning, when the judging means 79 presumes that parts of the foreign substance portion 2 remain.

Figure 11:
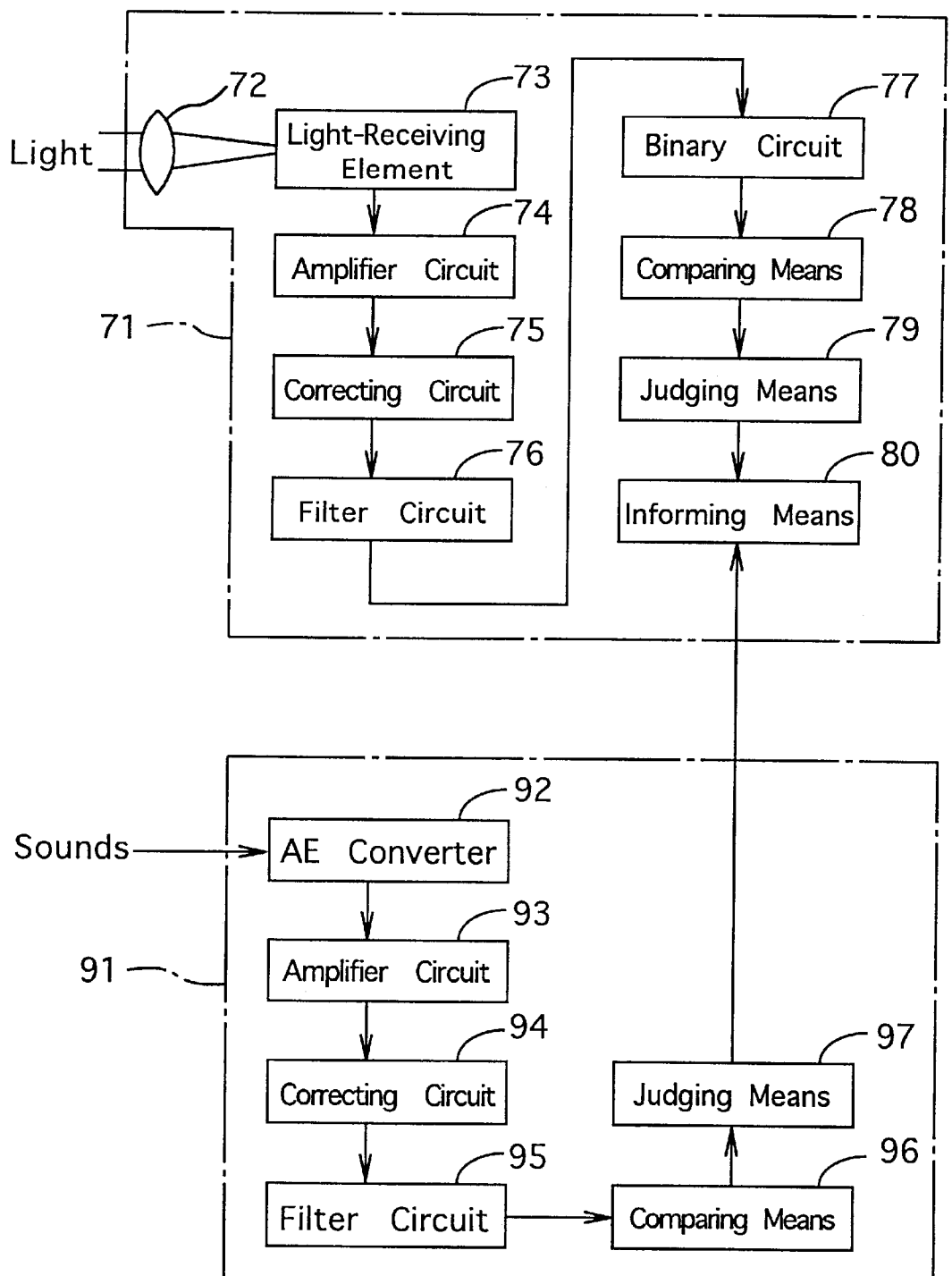
FIG. 11 shows a block diagram illustrating components constituting a detecting apparatus.
Figure 12:
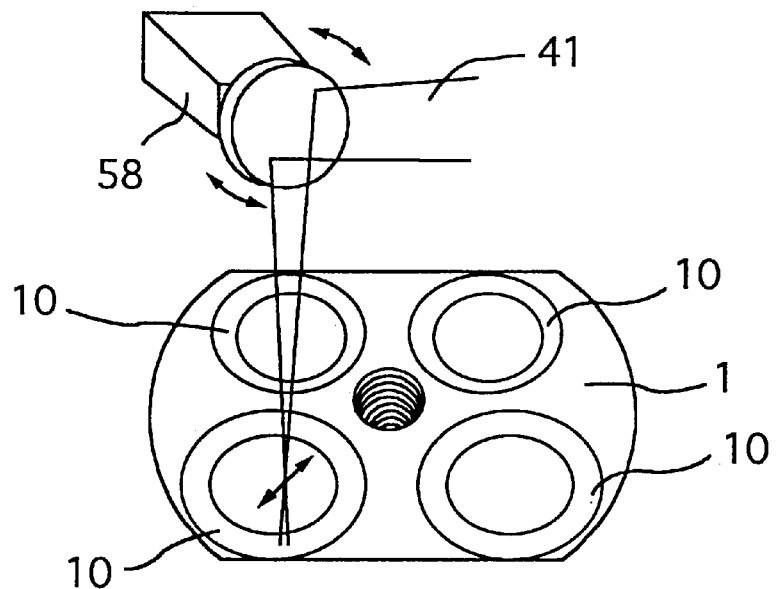
FIG. 12 shows an enlarged perspective view illustrating a situation in which the cladding-scheduled portion is irradiated with the laser beam discharged from the laser-discharging apparatus for eliminating the foreign substance portion.

The second detecting apparatus 91 is to detect a degree to eliminate the foreign substance portion 2, on the basis of a sound pressure constituting a physical amount, such as an audible sound pressure, generated in eliminating the foreign substance portion 2. Thus, as shown in FIG. 11, the second detecting apparatus 91 has an AE converter 92, an acoustic element, for converting the sound pressure to electric signals, an amplifier circuit 93 for amplifying the electric signals from the AE converter 92, a correcting circuit 94 for correcting a distortion of the sound signals, a filter circuit 95 for eliminating noises, a comparing means 96 for comparing the sound pressure signal with a predetermined threshold voltage, and a judging means 97.

The judging means 97 presumes that the foreign substance portion 2 is eliminated when the sound pressure signal is less than the predetermined threshold voltage. Also, in spite of performing the eliminating step, the judging means 97 presumes that parts of the foreign substance portion 2 remain when the sound pressure signal is equal to or more than the predetermined threshold voltage. The informing means 80 informs a warning when the judging means 79 presumes that parts of the foreign substance portion 2 remain.

Therefore, when the first detecting apparatus 71 informs no warnings, and when the second detecting apparatus 91 informs no warnings, the covering step is satisfactorily performed. The reason is that the eliminating step is performed to eliminate the foreign substance portion 2 in the cladding-scheduled portion 10.

When the first detecting apparatus 71 informs a warning, or when the second detecting apparatus 91 informs a warning, the covering step is not satisfactory. So, it is necessary to re-examine or scrap the workpiece 1. The reason is that parts of the foreign substance portion 2 probably remain in the cladding-scheduled portion 10.

The covering step uses the laser-discharging apparatus 40 which is used in the eliminating step. In Example 2, as shown in FIG. 10, the laser-discharging apparatus 40 constituted by the $CO_2$ laser discharges the laser beam 41 to each of the valve seats constituting the cladding-scheduled portions 10 in the cylinder head constituting the workpiece 1, by way of the lens 57 for adjusting a beam diameter, and by way of the beam oscillator 58.

Figure 13:
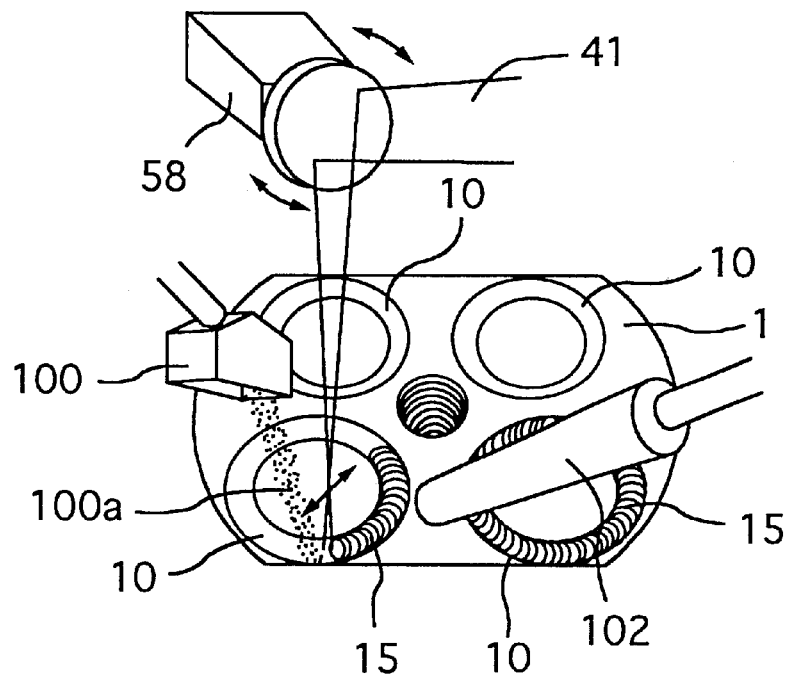
FIG. 13 shows an enlarged perspective view illustrating a situation in which the clad layer is piled on the cladding-scheduled portion by using the laser beam discharged from the laser-discharging apparatus.

In the covering step concerning Example 2, as shown in FIG. 13, the valve seats are irradiated with the laser beam 41 from the beam oscillator 58, while cladding powder 100a is supplied to the valve seats by a powder-supplying nozzle 100, and while a shielding gas is supplied to the valve seats by a shield-gas nozzle 102. Accordingly, the valve seats are covered with the clad layer 15.

Conditions in the covering step carried out by the present inventor were as follows:

A type of laser was $CO_2$ laser.

A laser output was set at 4.3 [kw].

A beam oscillation width was set at 5.5 [mm].

A moving workpiece-velocity was set at 1100 [mm/min].

A type of the cladding powder 100a was copper alloy powder.

A supplied amount of the cladding powder 100a was set at 1.1 [gf/second].

A shield gas, nitrogen, flow was set at 30 [liter/min].

Example 2 uses the both the first detecting apparatus 71 for detecting light and the second detecting apparatus 91 for detecting sounds. However, other example may use either the first detecting apparatus 71 for detecting light or the second detecting apparatus 91 for detecting sounds.

What is claimed is:

1. A process of cladding by welding, comprising:

preparing a workpiece having a cladding-scheduled portion including an exposed normal region, said exposed normal region having a normal surface possibly including a foreign substance portion forming a cladding defect;

irradiating said exposed normal region of said cladding-scheduled portion with a high-density energy beam capable of substantially eliminating or decreasing said foreign substance portion without substantially melting said exposed normal region; and covering said exposed normal region with a clad layer;

wherein said irradiating step uses at least one of a first detecting means and a second detecting means, said first detecting means for detecting light generated in eliminating or decreasing said foreign substance portion, and said second detecting means for detecting sounds generated in eliminating or decreasing said foreign substance portion.

2. The process of cladding by welding according to claim 1, wherein at least one of said first detecting means and said second detecting means is disposed to approach said cladding-scheduled portion.

3. The process of cladding by welding according to claim 1; wherein said first detecting means has a focusing lens through which said light passes, a light-receiving element for receiving said light passed through said focusing lens and for transmitting an electric signal, a binary circuit for converting said electric signal to a binarized signal, a comparing means for comparing said binarized signal with a predetermined threshold value, and a judging means;

said judging means for presuming that said foreign substance portion is eliminated when said binarized signal is less than said predetermined threshold value, and for presuming that said foreign substance portion remains when said binarized signal is more than said predetermined threshold value.

4. The process of cladding by welding according to claim 1; wherein said second detecting means has an acoustic element for converting a sound pressure of said sounds to a electric signal, a comparing means for comparing said electric signal with a predetermined threshold value, and a judging means;

said judging means for presuming that said foreign substance portion is eliminated when said electric signal caused by said sound pressure is less than said predetermined threshold value, and for presuming that said foreign substance portion remains when said electric signal is more than said predetermined threshold value.

5. A process of cladding by welding, comprising:

preparing a workpiece having a cladding-scheduled portion including an exposed normal region, said exposed normal region having a normal surface possibly including a foreign substance portion forming a cladding defect;

irradiating said exposed normal region of said cladding-scheduled portion with a high-density energy beam capable of eliminating or decreasing said foreign substance portion without substantially melting said exposed normal region; and covering said exposed normal region with a clad layer;

wherein in said eliminating step, "P1" exhibits output of said high-density energy beam, "Q-1" exhibits irradiation energy strength of said high-density energy beam per unit time and unit area, and "VI" exhibits a relative moving velocity between the workpiece and said high-density energy beam;

in said covering step, "P2" exhibits output of said high-density energy beam, "Q2" exhibits irradiation energy strength of said high-density energy beam per unit time and unit area, and "V2" exhibits a relative moving velocity between the workpiece and said high-density energy beam; and at least one of the following conditions (1)–(3) is set:
(1) P1<P2
(2) Q1<Q2
(3) V2>V1.

6. A process of cladding by welding, comprising:

preparing a workpiece having a cladding-scheduled portion including an exposed normal region, said exposed normal region having a normal surface Possibly including a foreign substance portion forming a cladding defect;

irradiating said exposed normal region of said cladding-scheduled portion with a high-density energy beam capable of eliminating or decreasing said foreign substance portion without substantially melting said exposed normal region; and covering said exposed normal region with a clad layer;

wherein said eliminating step is performed in at least one of one manner and another manner,
said one manner including that said input heat per unit time and unit area to said cladding-scheduled portion is set more than 1 j/mm², and
said another manner including that irradiation energy strength of said high-density energy beam per unit time and unit area to said cladding-scheduled portion is set more than 85 w/mm².

7. A process of cladding by welding, comprising:

preparing a workpiece having a cladding-scheduled portion including an exposed normal region, said exposed normal region having a normal surface possibly including a foreign substance portion forming a cladding defect;

irradiating said exposed normal region of said cladding-scheduled portion with a high-density energy beam, capable of eliminating or decreasing said foreign substance portion without substantially melting said exposed normal region;

covering said exposed normal region with a clad layer;

wherein said cladding-scheduled portion has a ring shape to include an inner verge, an outer verge, and a middle portion between said inner verge and said outer verge; and wherein said cladding-scheduled portion is continuously irradiated with said high-density energy beams as follows:
(1) said high-density energy beam spirally hits said inner verge of said cladding-scheduled portion,
(2) said high-density energy beam spirally hits said middle portion of said cladding-scheduled portion, and
(3) said high-density energy beam hits said outer verge of said cladding-scheduled portion.

8. A process of cladding by welding, comprising:

preparing a workpiece having a cladding-scheduled portion possibly including an exposed normal region, said exposed normal region having a normal surface including a foreign substance portion forming a cladding defect;

irradiating said exposed normal region of said cladding-scheduled portion with a high-density energy beam, capable of eliminating or decreasing said foreign substance portion without substantially melting said exposed normal region;

covering the exposed normal region with a clad layer;

wherein said cladding-scheduled portion has a ring shape to include an inner verge, an outer verge, and a middle portion between said inner verge and said outer verge; and wherein said cladding-scheduled portion is continuously irradiated with said high-density energy beam as follows:
(1) said high-density energy beam hits said outer verge of said cladding-scheduled portion,
(2) said high-density energy beam spirally hits said middle portion of said cladding-scheduled portion, and
(3) said high-density energy beam spirally hits said inner verge of said cladding-scheduled portion.

9. A process of cladding by welding, comprising the steps of:

preparing a workpiece having a cladding-scheduled portion including an exposed normal region, said exposed normal region having a normal surface possibly including a foreign substance portion which can cause a cladding defect;

irradiating said exposed normal region of said cladding-scheduled portion of said workpiece with a high-density energy beam, said high-density energy beam substantially eliminating or decreasing said foreign substance portion without substantially melting said exposed normal region of said cladding-scheduled portion; and covering said exposed normal region of said cladding-scheduled portion of said workpiece with a clad layer wherein said covering step includes emitting a high-density energy beam to copper alloy powder disposed on said exposed normal region of said cladding-scheduled portion.

* * * * *

UNITED STATES PATENT AND TRADEMARK OFFICE
CERTIFICATE OF CORRECTION

PATENT NO. : 6,329,630 B1
DATED : December 11, 2001
INVENTOR(S) : Akio Sato et al.

It is certified that error appears in the above-identified patent and that said Letters Patent is hereby corrected as shown below:

Column 13, claim 5,
Line 15, "VI" should read -- V1 --.

Column 13, claim 6,
Line 32, "Possibly" should read -- possibly --.

Signed and Sealed this

Sixteenth Day of April, 2002

Attest:

Attesting Officer

JAMES E. ROGAN
*Director of the United States Patent and Trademark Office*